US009633412B2

(12) United States Patent
Hong et al.

(10) Patent No.: US 9,633,412 B2
(45) Date of Patent: Apr. 25, 2017

(54) METHOD OF ADJUSTING SCREEN MAGNIFICATION OF ELECTRONIC DEVICE, MACHINE-READABLE STORAGE MEDIUM, AND ELECTRONIC DEVICE

(71) Applicant: Samsung Electronics Co., Ltd., Suwon-si, Gyeonggi-do (KR)

(72) Inventors: Duk-Ki Hong, Suwon-si (KR); Sang-Hyup Lee, Suwon-si (KR); Jin-Ha Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 14/457,642

(22) Filed: Aug. 12, 2014

(65) Prior Publication Data

US 2015/0062183 A1     Mar. 5, 2015

(30) Foreign Application Priority Data

Aug. 27, 2013  (KR) .......................... 10-2013-0101982

(51) Int. Cl.
  *G06T 3/40*     (2006.01)
  *G06F 3/0484*   (2013.01)
  *G06F 3/147*    (2006.01)
  *G09G 5/00*     (2006.01)
(52) U.S. Cl.
  CPC ............ *G06T 3/40* (2013.01); *G06F 3/04847* (2013.01); *G06F 3/147* (2013.01); *G09G 5/00* (2013.01); *G06F 2203/04806* (2013.01); *G09G 2320/0613* (2013.01); *G09G 2320/08* (2013.01); *G09G 2340/0407* (2013.01); *G09G 2340/14* (2013.01)

(58) Field of Classification Search
  None
  See application file for complete search history.

(56) References Cited

U.S. PATENT DOCUMENTS

| 2009/0222761 | A1  | 9/2009 | Hayashi |
| 2010/0011285 | A1  | 1/2010 | Kawata et al. |
| 2013/0086508 | A1  | 4/2013 | Oguz |
| 2014/0237421 | A1* | 8/2014 | Kuhne ................. G06F 17/211 715/800 |

(Continued)

FOREIGN PATENT DOCUMENTS

EP     2 573 755 A2    3/2013

OTHER PUBLICATIONS

Shulz; Get a Better View in Windows 7 by Adjsuting DPI Scaling; www.techrepublic.com/blog/window-on-windows/get-a-better-view-in-windows-7-by-adjusting-dpi-scaling/5404; Dec. 1, 2013, captured Jan. 17, 2013.*

(Continued)

*Primary Examiner* — Maurice L McDowell, Jr.
(74) *Attorney, Agent, or Firm* — Jefferson IP Law, LLP

(57) ABSTRACT

A method of adjusting a screen magnification of an electronic device is provided. The method includes displaying a Dots Per Inch (DPI) setting screen in order to adjust a screen magnification of an object that is to be displayed on a display unit of the electronic device, receiving information about changed DPI through the DPI setting screen, calculating a screen magnification using the changed DPI and a preset Device-Independent Pixel (DIP), changing a size of the object to correspond to the calculated screen magnification, and displaying the object according to the changed size.

11 Claims, 11 Drawing Sheets

(56) References Cited

U.S. PATENT DOCUMENTS

2015/0019227 A1\* 1/2015 Anandarajah ........... G10L 15/22
704/257
2015/0084885 A1\* 3/2015 Kawamoto ........... G06F 3/0482
345/173

OTHER PUBLICATIONS

Android Developers; Supporting Multiple Screens; https://web.archive.org/web/20130803002134/http://developerandroid.com/guide/practices/screens_support.html; captured by the Internet Archive Aug. 3, 2013.\*

Nandi, How to change app's display DPI and UI without Paranoid Android, FAQhttp://technofaq.org/posts/2013/04/howtochangeappsdisplaydpianduiwithoutparanoidandroid/; dated Apr. 2013; captured by the Internet Archive as early as Jul. 8, 2013.\*

\* cited by examiner

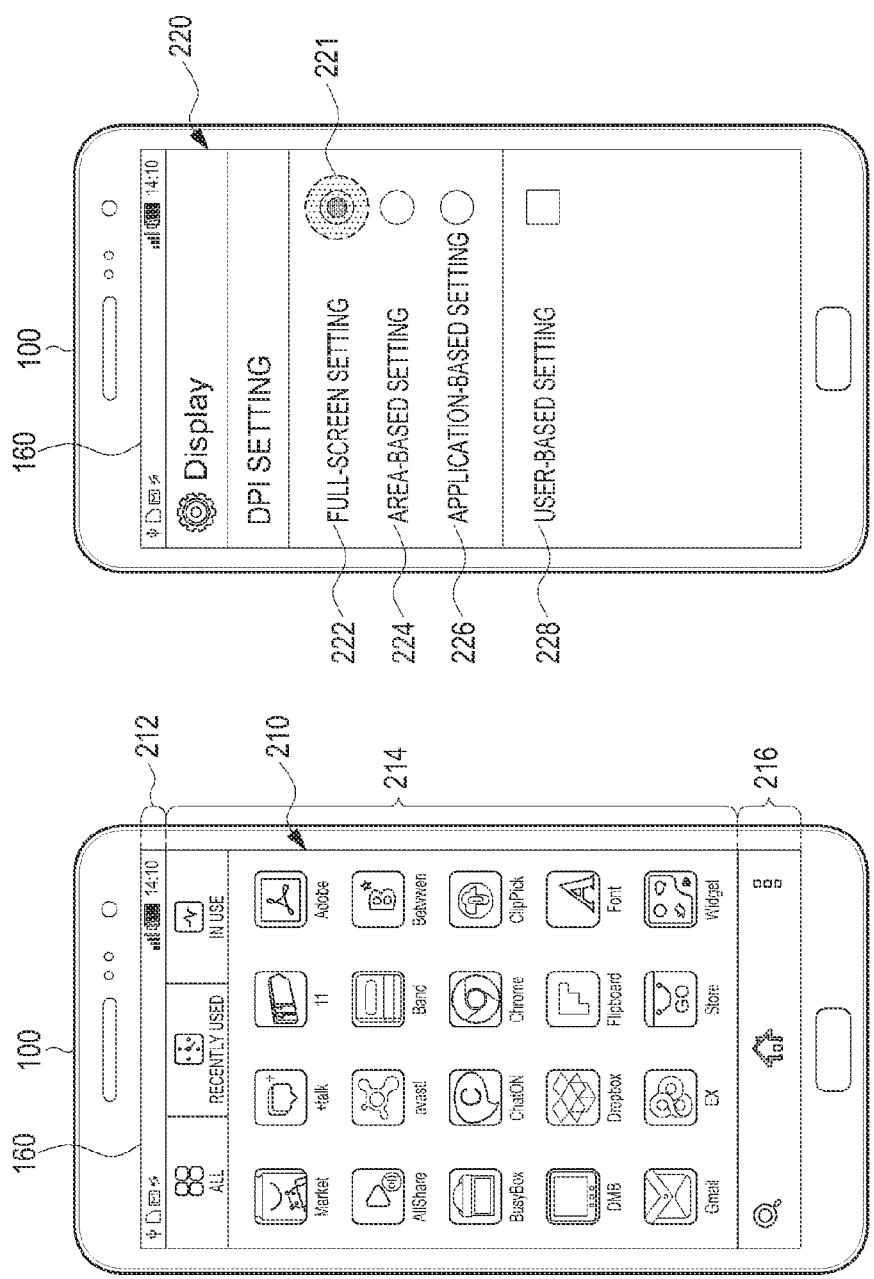

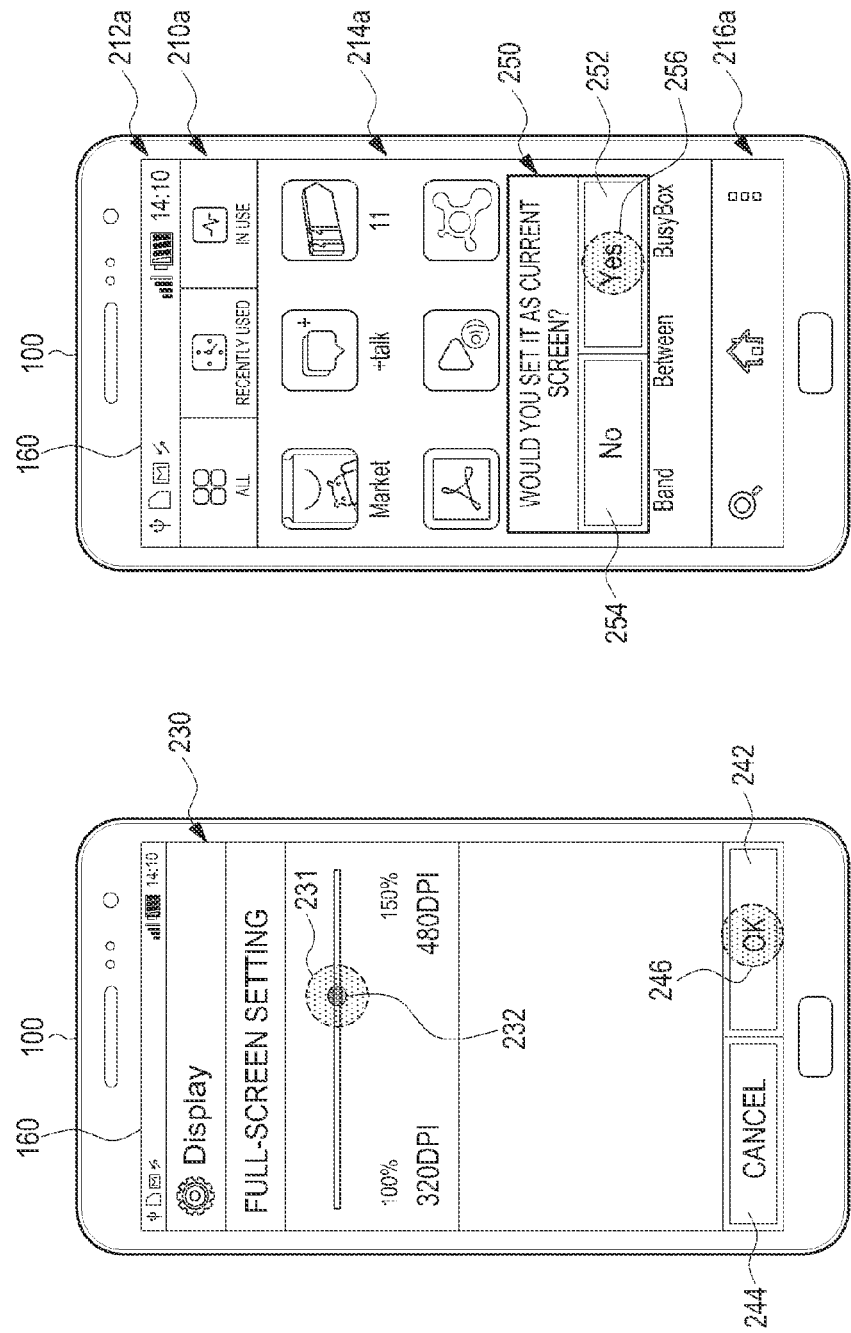

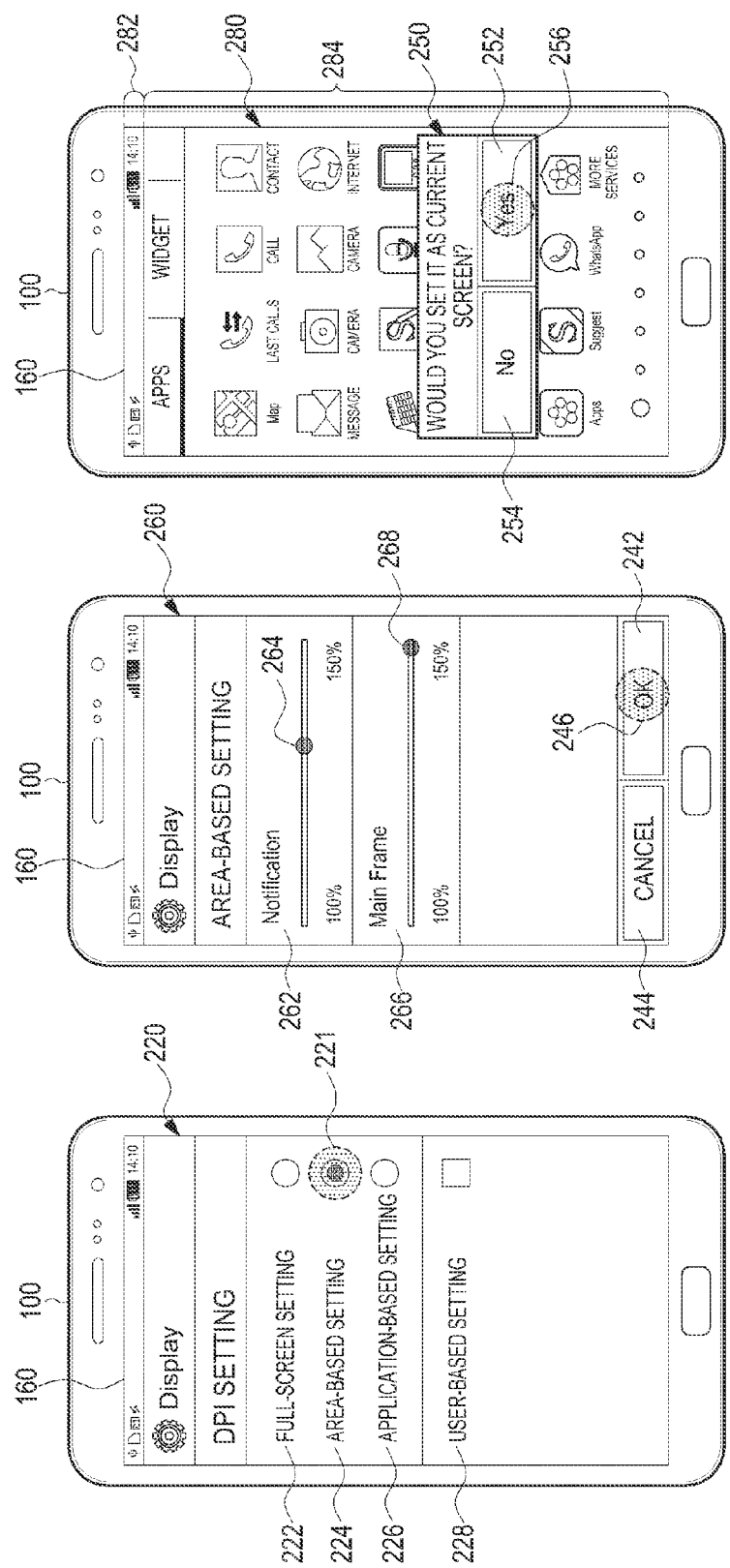

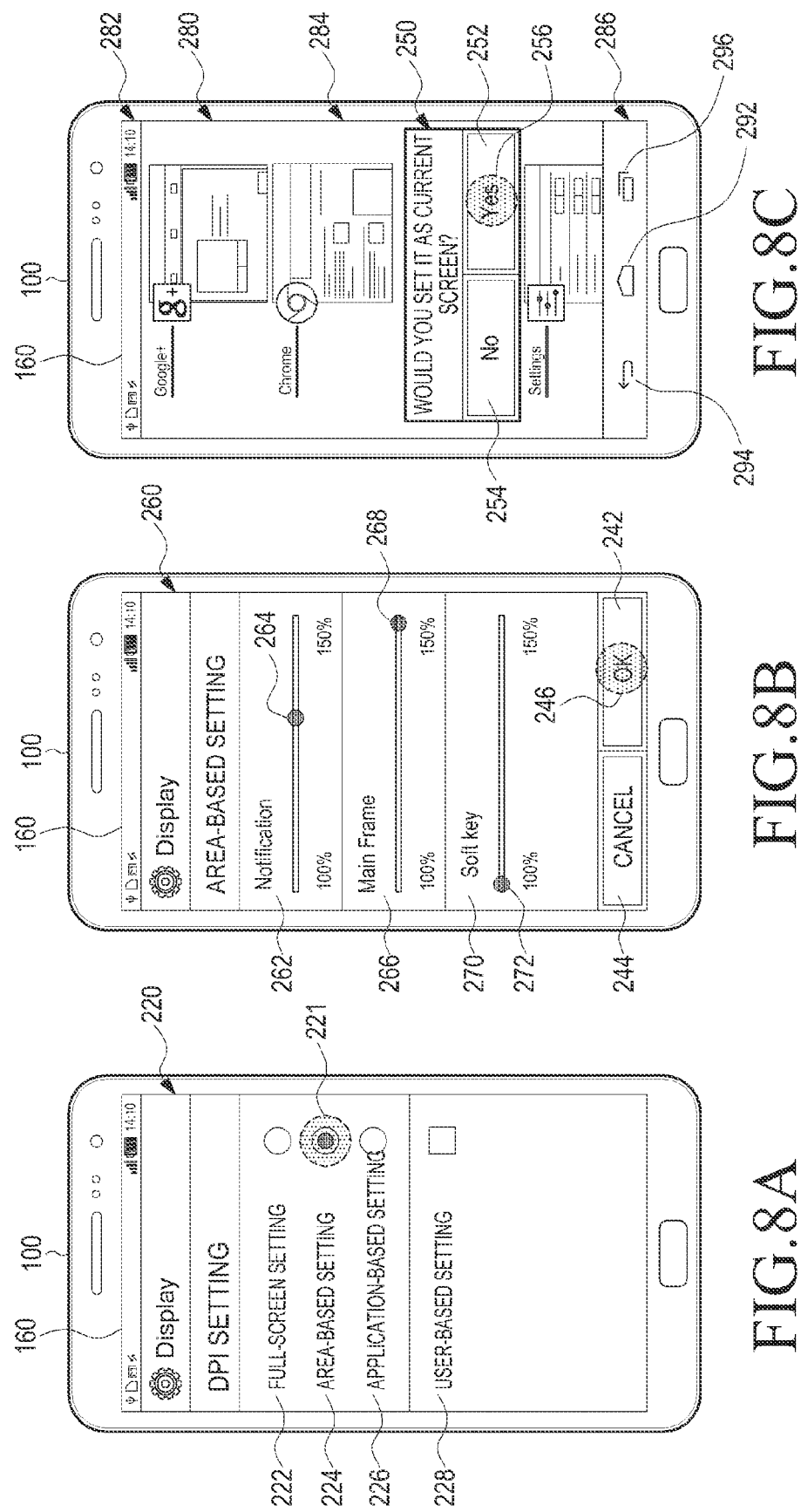

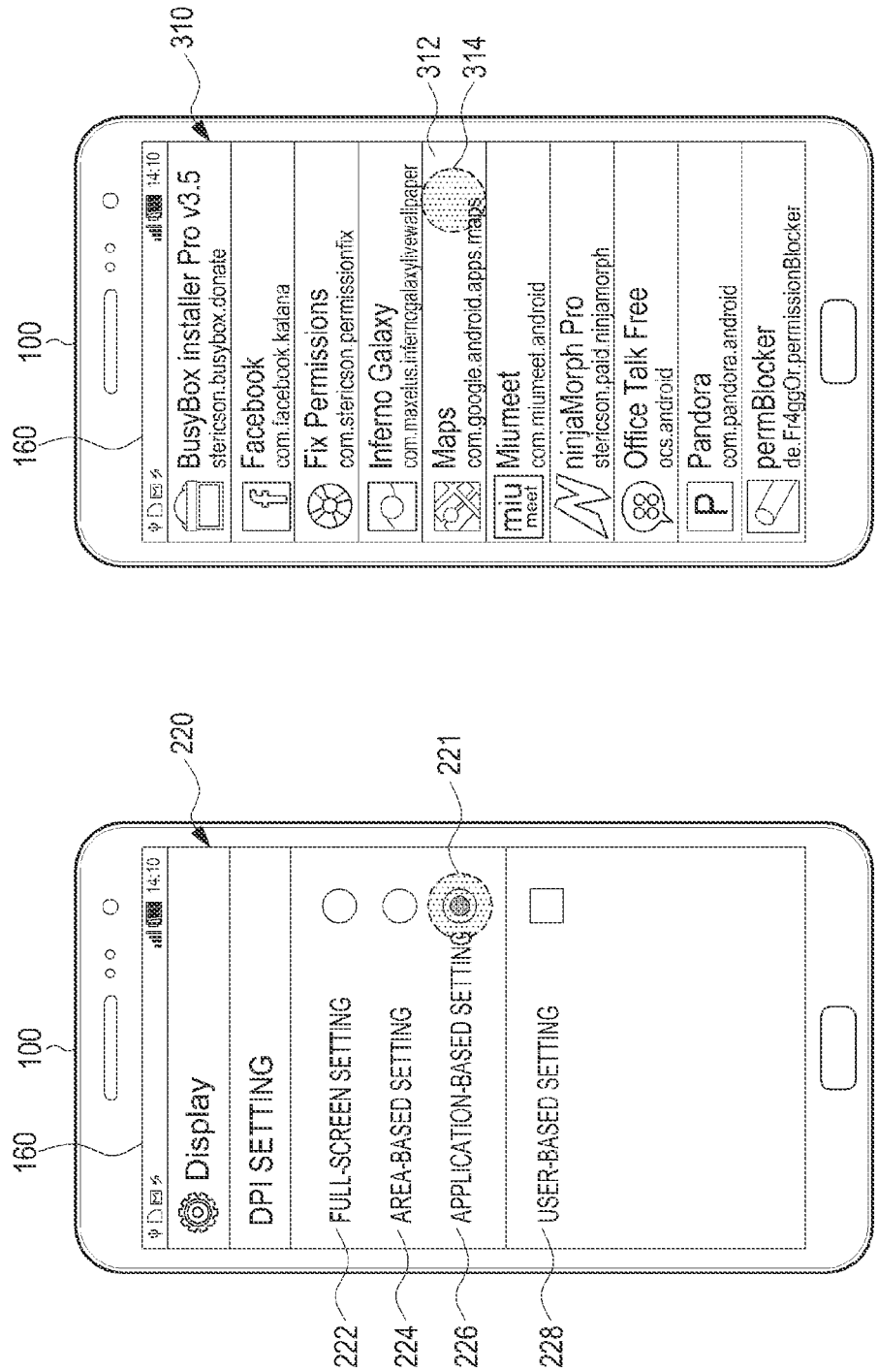

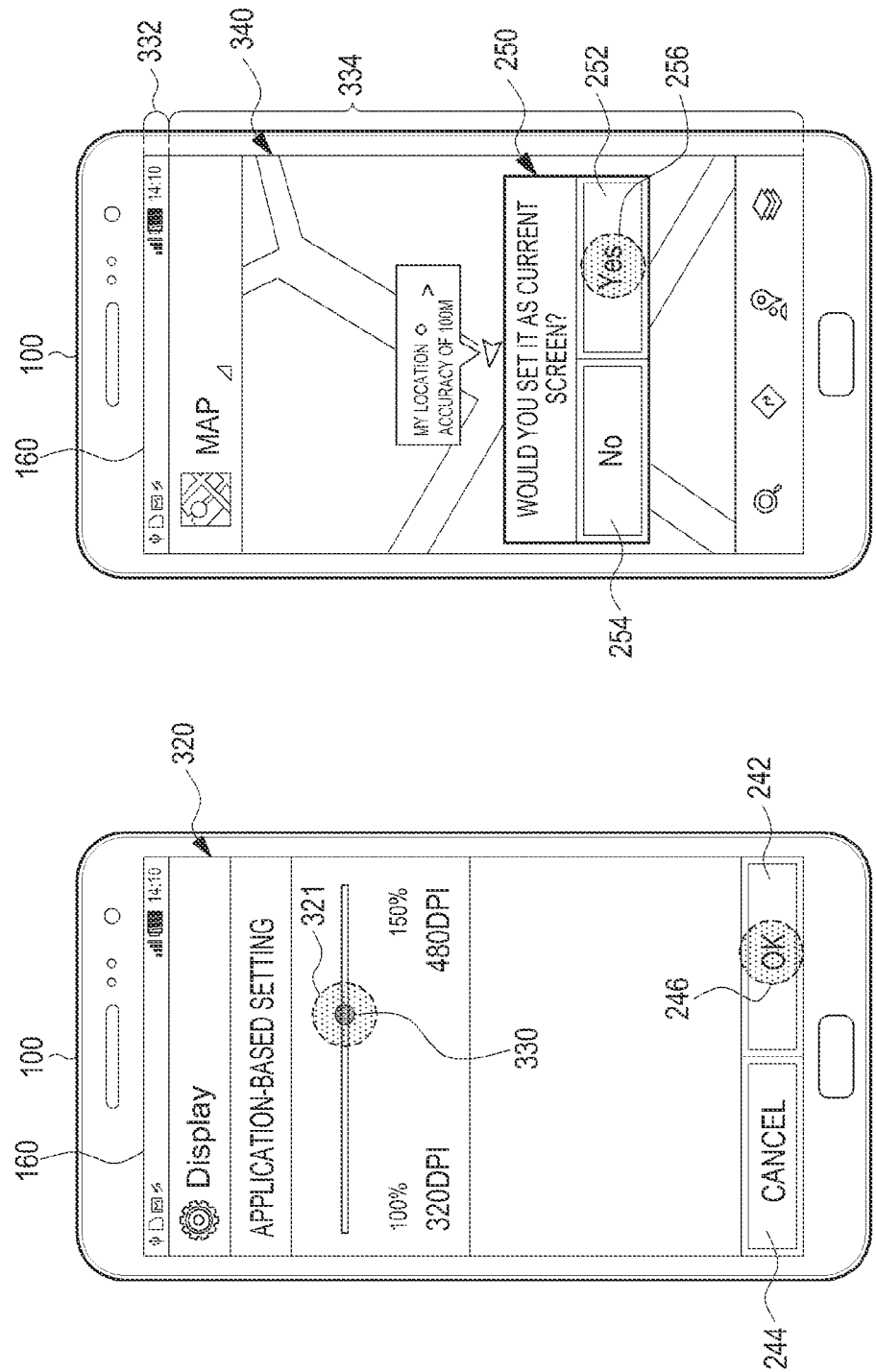

METHOD OF ADJUSTING SCREEN MAGNIFICATION OF ELECTRONIC DEVICE, MACHINE-READABLE STORAGE MEDIUM, AND ELECTRONIC DEVICE

CROSS-REFERENCE TO RELATED APPLICATION(S)

This application claims the benefit under 35 U.S.C. §119(a) of a Korean patent application filed on Aug. 27, 2013 in the Korean Intellectual Property Office and assigned Serial number 10-2013-0101982, the entire disclosure of which is hereby incorporated by reference.

TECHNICAL FIELD

The present disclosure relates to a method of adjusting a screen magnification of an electronic device.

BACKGROUND

Lately, digital multimedia services such as moving images that are provided to users through a mobile phone are attracting great demand. However, persons with limited vision may have difficulty seeing small writings on the screen of a mobile phone with a small screen size. Generally, because a larger screen size is often correlated with higher display resolution, a user does not experience a big difference in seeing writings, icons, images, and/or the like, through a device having a relatively large screen, compared to when the user views the writings, icons, images, and/or the like through a device having a small screen. For example, in the related art, an electronic device has low readability due to a limited screen size thereof, and although a user changes the font size, readability on most of applications could not be improved.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of adjusting a screen magnification of an electronic device through a simple manipulation, wherein the method can be applied to most of existing applications without modifying the applications.

In accordance with an aspect of the present disclosure, a method of adjusting a screen magnification of an electronic device is provided. The method includes displaying a Dots Per Inch (DPI) setting screen to adjust a screen magnification of an object that is to be displayed on a display unit of the electronic device, receiving information about changed DPI through the DPI setting screen, calculating a screen magnification using the changed DPI and predetermined Device-Independent Pixel (DIP), and changing a size of the object to correspond to the calculated screen magnification, and displaying the object.

In accordance with another aspect of the present disclosure, an electronic device is provided. The electronic device includes a display unit configured to display a screen, a storage unit configured to store Dots Per Inch (DPI) of the display unit, and a controller configured to control the display unit to display a DPI setting screen to adjust a screen magnification of an object that is to be displayed on the display unit, to receive information about changed DPI through the DPI setting screen, to calculate a screen magnification using the changed DPI and predetermined Device-Independent Pixel (DIP), and to change a size of the object to correspond to the calculated screen magnification, and display the object.

In accordance with another aspect of the present disclosure, a method of adjusting a screen magnification of an electronic device is provided. The method includes detecting an input for changing a Dots Per Inch (DPI) of at least one object to be displayed on a display unit of the electronic device, calculating a magnification of the object according to a changed DPI corresponding to the input, a preset Device-Independent Pixel (DIP), and an object size threshold, changing a size of the at least one object according to the calculated magnification, and displaying the at least one object according to the changed size.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 6A, and 6B are views for describing an example of a method of changing an object size described by DIP and DPI according to a DPI setting to magnify or reduce a full screen of a display unit according to an embodiment of the present disclosure;

FIGS. 7A, 7B, and 7C are views for describing an example of a method of changing an object size described by DIP and DPI according to a DPI setting to independently magnify or reduce individual areas of a display unit according to an embodiment of the present disclosure;

FIGS. 8A, 8B, and 8C are views for describing an example of a method of changing an object size described by DIP and DPI according to a DPI setting to independently magnify or reduce individual areas of a display unit according to an embodiment of the present disclosure;

FIGS. 9A, 9B, 10A, and 10B are views for describing an example of a method of changing an object size described by DIP and DPI according to a DPI setting to independently magnify or reduce individual applications according to an embodiment of the present disclosure.

Throughout the drawings, like reference numerals will be understood to refer to like parts, components, and structures.

DETAILED DESCRIPTION

Figure 1:
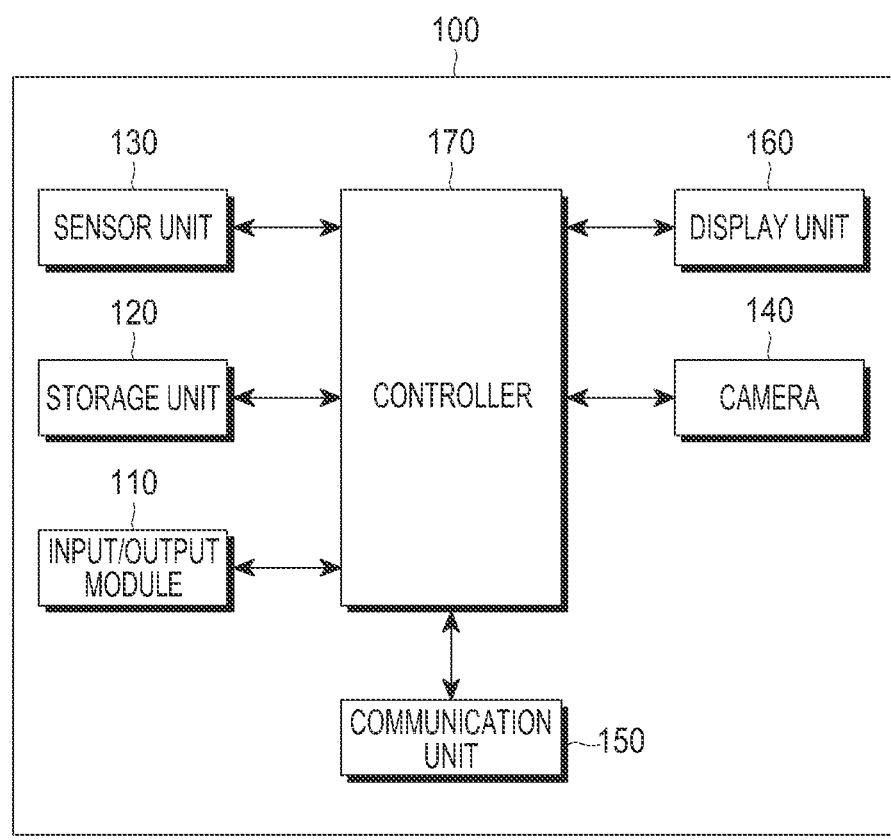
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

It will be understood that, although the terms first, second, and/or the like may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may be any electronic device, and may be also referred to as a terminal, a mobile terminal, a communication terminal, a portable communication terminal, a portable mobile terminal, or a display device.

For example, the electronic device may be a smart phone, a mobile phone, a navigation system, a game, a TeleVision (TV), a notebook computer, a laptop computer, a tablet computer, a Personal Multimedia Player (PMP), or Personal Digital Assistants (PDA), a video phone, an e-book reader, an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like. In addition, the electronic device may be implemented as a portable communication terminal of a pocket size having a wireless communication function. In addition, the electronic device may be a flexible device or a flexible display device.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, the electronic device may perform tasks through communication or interworking with an external electronic device such as a server. For example, the electronic device may transmit an image photographed by a camera and/or location information detected by a sensor to a server through a network. The network may be a mobile communication network, a cellular communication network, a Local Area Network (LAN), a Wireless Local Area Network (WLAN), a Wide Area Network (WAN), Internet, or a Small Area Network (SAN). However, the network is not limited to the above-mentioned networks.

FIG. 1 is a block diagram illustrating an electronic device according to an embodiment of the present disclosure.

Referring to FIG. 1, a representative configuration of an electronic device is provided. According to various embodiments of the present disclosure, some components of the electronic device may be omitted or modified as necessary.

Referring to FIG. 1, an electronic device 100 may include an input/output module 110, a storage unit 120, a sensor unit 130, a camera 140, a communication unit 150, a display unit 160, and a controller 170.

The input/output module 110 is used to receive a user input or to inform a user of information. The input/output module 110 may include at least one(s) of a plurality of buttons, a microphone, a speaker, a vibration motor, a connector, a keypad, a mouse, a trackball, a joystick, cursor direction keys, a cursor control, and/or the like.

The buttons may be provided on the front, side, and/or rear part of the electronic device 100. The buttons may include at least one of a power/lock button (not shown), volume buttons (not shown), a menu button (not shown), a home button (not shown), a back button (not shown), a search button (not shown), and/or the like.

The microphone may receive voice or sound, and generate electronic signals under the control of the controller 170.

The speaker may output sound corresponding to various signals (e.g., radio signals, broadcasting signals, a digital audio file, a digital video file, a photo file, and/or the like) to the outside of the electronic device 100, under the control of the controller 170. In addition, the speaker may output sound corresponding to a function that is performed by the electronic device 100. The speaker may be provided as at least one unit at an appropriate location (or locations) on the housing of the electronic device 100. According to various embodiments of the present disclosure, the electronic device 100 may include a plurality of speakers.

The vibration motor converts an electrical signal into mechanical vibration under the control of the controller 170. For example, when the electronic device 100 is in a vibration mode, the vibration motor operates if a voice call is received from another device (not shown). The vibration motor may be provided as at least one unit in the electronic device 100. The vibration motor may operate in response to a user touch operation of touching the display unit 160, in response to a user touch-and-drag operation of touching and dragging the display unit 160, and/or the like.

The connector may be used as an interface for connecting the electronic device 100 to a server (not shown), an external electronic device (not shown), or a power source (not shown). The controller 170 may transmit data stored in the storage unit 120 of the electronic device 100 to an external device (not shown) through a wired cable connected to the connector, or the controller 110 may receive data of an external device through the wired cable connected to the connector. The electronic device 100 may receive power or charge a battery (not shown) from a power source (not shown) through the wired cable connected to the connector.

The keypad may receive a key input from a user in order to control the electronic device 100. The keypad may include a physical keypad (not shown) that is provided on the electronic device 100, or a virtual keypad (not shown) that is displayed on the display unit 160.

The storage unit 120 may store data for executing one or more applications, such as a voice recognition application, a scheduler application, a word processing application, a music application, an Internet application, a map application, a camera application, an E-mail application, an image editing application, a search application, a file search application, a video application, a game application, a Social Networking Service (SNS) application, a call application, a messenger application, and/or the like. The storage unit 120 may store images for providing a Graphical User Interface (GUI) related to one or more applications, data or database such as user information and document, background images (e.g., a menu screen, an idle screen, and/or the like) or operating programs needed to drive the electronic device 100, and images photographed by the camera 140. The storage unit 120 may be a non-transitory machine-readable (e.g., computer-readable) medium, and the term "machine-readable medium" may correspond to a medium capable of providing data to a machine in order for the machine to be able to perform a predetermined function. The machine-readable medium may be storage medium. The storage unit 120 may be volatile or non-volatile medium. The above-mentioned media should be tangible media such that commands transferred from the media can be detected by a physical instrument.

Examples of the non-transitory machine-readable medium include floppy disks, flexible disks, hard disks, magnetic tapes, Compact Disc Read-Only Memory (CD-ROM), optical disks, punchcard, papertape, Random Access Memory (RAM), Programmable Read-Only Memory (PROM), Erasable PROM (EPROM), flash-EPROM, and/or the like.

The sensor unit 130 may include one or more sensors that can detect a state (e.g., a location, a point of the compass, a movement, and/or the like) of the electronic device 100. For example, the sensor unit 130 may be a proximity sensor to detect a user's approach to the electronic device 100, a motion/compass sensor to detect an operation (e.g., a rotation, an acceleration, a deceleration, a vibration, and/or the like), and/or the like of the electronic device 100. The motion/compass sensor may be an accelerometer sensor (or a gravity sensor) to measure a gradient and to detect a change in velocity on a straight line, a gyro sensor to detect angular velocity, an impact sensor, a Global Positioning System (GPS) sensor, a compass sensor (or a geomagnetic sensor) to detect a point of the compass, an inertia sensor to detect an inertial force of motion to provide various information such as an acceleration, velocity, a direction, and a distance of a moving object to be measured, and/or the like. The sensor unit 130 may detect a state of the electronic device 100, generate a signal corresponding to the detected state of the electronic device 100, and transmit the signal to the controller 170. For example, the GPS sensor may receive radio waves from a plurality of GPS satellites (not shown) on the orbit around the earth, and calculate a GPS location of the electronic device 100 based on a time of arrival of the radio waves. The compass sensor may detect a position or a point of the compass of the electronic device 100.

The camera 140 may include a lens system to focus light incident from the outside to form an optical image of a subject, an image sensor to convert an optical image into an electrical image signal or data, and a driver to drive the image sensor under the control of the controller 170. The camera 140 may further include a flash, and/or the like.

The communication unit 150 may connect the electronic device 100 to a server or an external electronic device directly or through a network, and/or the like. The communication unit 150 may be a wired or wireless communication unit. The communication unit 150 may transmit data received from the controller 170, the storage unit 120, or the camera 140 in a wired or wireless manner, and/or receive data from an external communication line or from the air in a wired or wireless manner, and transfer the received data to the controller 170 or store the received data in the storage unit 120.

The communication unit 150 may be a mobile communication module, a WLAN module, or a short-range communication module. More specifically, the communication unit 150 may be an Integrated Services Digital Network (ISDN) card, a modem, a LAN card, an infrared port, a Bluetooth port, a Zigbee port, a wireless port, and/or the like.

According to various embodiments of the present disclosure, the mobile communication module may connect the electronic device 100 to an external device through mobile communication using one or more antennas, under the control of the controller 170. The mobile communication module may transmit/receive Radio Frequency (RF) signals for data exchange or unidirectional transmission/reception for voice calls, video calls, Short Message Service (SMS), Multimedia Message Service (MMS), and/or the like with a device (not shown) such as a mobile phone, a smart phone, a tablet PC, or another electronic device having a phone number or a network address input to the electronic device 100, to/from the electronic device 100.

According to various embodiments of the present disclosure, the WLAN module may connect to the Internet at a place at which a wireless Access Point (AP) (not shown) has been installed, under the control of the controller 170. The WLAN module supports Institute of Electrical and Electronics Engineers (IEEE) 802.11x. The short-range communication module may perform wireless short-range communication between the electronic device 100 and an image forming apparatus (not shown) under the control of the controller 170. The short-range communication may be Bluetooth, Infrared Data Association (IrDA), Near Field Communication (NFC), and/or the like.

The display unit 160 may display images or data received from the controller 170 on a screen. The display unit 160 may be a Liquid Crystal Display (LCD), a touch screen, and/or the like. The display unit 160 may display images under the control of the controller 170, generate a key contact interrupt when a user input means, such as a finger or a stylus pen, has contacted the surface of the display unit 160, and output user input information including input coordinates and an input state to the controller 170, under the control of the controller 170.

The display unit 160 may provide a user with GUIs corresponding to various services (e.g., a call, data transmission, broadcasting, photographing, video recording, and/or the like). The display unit 160 may transmit user input information corresponding to one or more touch operations input to a GUI to the controller 170. The display unit 160 may receive at least one touch operation through a user body part (e.g., a finger including a thumb) or a pointing device (e.g., a stylus pen). In addition, the display unit 160 may receive a touch-and-drag operation, and transmit user input information corresponding to the touch-and-drag operation to the controller 170.

According to various embodiments of the present disclosure, the term "touch" is not limited to a contact of a user (e.g., a user body part) or a pointing device (e.g., a stylus) to the display unit 160. The term "touch" may include non-contact recognition (e.g., when a user body part or a pointing device is located within a recognition distance (e.g., between 0 cm and 5 cm) in which the user body part or the pointing device can be detected without a direct contact to the display unit 160). The recognition distance in which the display unit 160 can recognize the user body part or the pointing device may increase depending on the hovering sensing capability (e.g., detecting capability) of the display unit 160. The display unit 160 may be a touch screen. For example, the display unit 160 may be a resistive touch screen, a capacitive touch screen, an infrared touch screen, an acoustic wave touch screen, an ElectroMagnetic (EM) touch screen, an ElectroMagnetic Resonance (EMR) touch screen, and/or the like.

The controller 170 may execute an application according to user input information, and the application may execute a predetermined program according to user input information. The user input may include an input through the input/output module 110, the display unit 160, or the sensor unit 130, and an input based on the camera 140. The controller 170 may include a bus for information communication, and a processor connected to the bus for information processing. The controller 170 may include a Central Processing Unit (CPU) an Application Processor (AP), and/or the like.

The controller 170 may further include memory (e.g., RAM) connected to the bus and used for temporarily storing information required by the processor, and memory (e.g., ROM) connected to the bus and used for storing static information required by the processor.

The controller 170 may control overall operation of the electronic device 100. According to various embodiments of the present disclosure, the controller 170 may perform a method (e.g., a screen magnification adjusting method) of changing an object size described by Device-Independent Pixels (DIP) and Dots Per Inch (DPI) according to a DPI setting to magnify or reduce the full screen or a part of the screen of the display unit 160.

According to various embodiments of the present disclosure, a size of an object that is displayed on a screen is described by DIP and DPI.

For example, a source code for a button is as follows.

TABLE 1

<Button
   android:layout_width="100dp"
   android:layout_height="wrap_content"/>

An equation for calculating px which is a size of an object is as follows.

$$px = DIP * (DPI/160) \qquad \text{Equation (1)}$$

Herein, px represents the number of horizontal pixels of the button that is to be displayed on a screen, and dp represents a unit of DIP.

For example, if DPI is 320, px which is the number of horizontal pixels of the button is calculated as 200 (i.e., 100×320/160). As another example, if DPI is 480, px which is the number of horizontal pixels of the button is calculated as 300 (i.e., 100×480/160).

Because px is an absolute display unit corresponding to a designated value regardless of DPI, and thus, not a relative display unit considering DPI, describing an object size using px may cause various problems.

For example, if a button is described based on 320 DPI, and four buttons fully occupy the horizontal width of an application screen. In this case, if 320 DPI changes to 480 DPI, each button is reduced, and a large blank space (a blank space of 160 pixels per inch) is made to the right or left of the four buttons.

DPI represents the number of pixels per unit length, and DPI is also called Pixels Per Inch (PPI). As an example, Android specifies four types of display in relation to DPI: Low Dots Per Inch (LDPI), Medium Dots Per Inch (MDPI), High Dots Per Inch (HDPI), and Extra High Dots Per Inch (EHDPI). The MDPI corresponds to 160 PPI, LDPI corresponds to 120 PPI (0.75×160 PPI), HDPI corresponds to 240 PPI (1.5×160 PPI), and XHDPI corresponds to 320 PPI (2×160 PPI). DPI is also called pixel density, such as device density, display density, screen density, or system density, or called simply density.

In order to overcome problems that are generated when an object size is described by an absolute number, the concept of DIP has been introduced. For example, DIP is a concept introduced to achieve uniformity in size of objects at any DPI. DIP increases an object size to a designated magnification at DPI more than standard DPI, and decreases an object size to a designated magnification at DPI less than the standard DPI.

According to various embodiments of the present disclosure, a method of changing an object size described by DIP and DPI according to a DPI setting to magnify or reduce the full screen or a part of the screen of a display unit is provided. According to various embodiments of the present disclosure, the part of the screen that is to be reduced or magnified corresponds to a window, a frame, an application screen, and/or the like in which an object size is determined with reference to DPI according to environment settings and a predetermined DIP.

The full screen (or the full area) of the display unit 160 may be divided into one or more screens (or one or more areas). The full screen of the display unit 160 may be comprised of a state (or state notification) bar screen and/or an application screen which may include a home screen, an application window, a handwriting input window, a character input window (or a keyboard), the like, or a combination thereof. The home screen may be referred to as a home application screen, and the state bar screen may be referred to as a state bar application screen. Each screen may be a unit that may be reduced or magnified, and the application screen also may be a unit that may be reduced or magnified. Application screens or the lower level application screens (e.g., a menu application screen or a background application screen) in the higher level application screen (e.g., a home application screen) that may be the units to be reduced or magnified have independent user interfaces such that a user input, such as a selection or a text input, can be done through the user interfaces. The application screens that may be the units to be reduced or magnified can be classified depending on whether creation (or execution), termination, and/or screen conversion (e.g., conversion from a message application screen to a video application screen, page turning of a background screen, conversion from a message application screen to a home screen, and/or the like) of the application screens can be independently performed.

The object may be an image or text that can be displayed on the display unit 160 of the electronic device 100. For example, the object may be an application window, a menu, a function item (or a menu item), document, a widget, a picture, video, E-mail, a SMS message, a MMS message, and/or the like. The object may be selected, executed, deleted, canceled, stored, or changed by user input means. The object may be a button, a shortcut icon, a thumbnail image, a folder that stores one or more objects in the electronic device 100, and/or the like.

Figure 2:
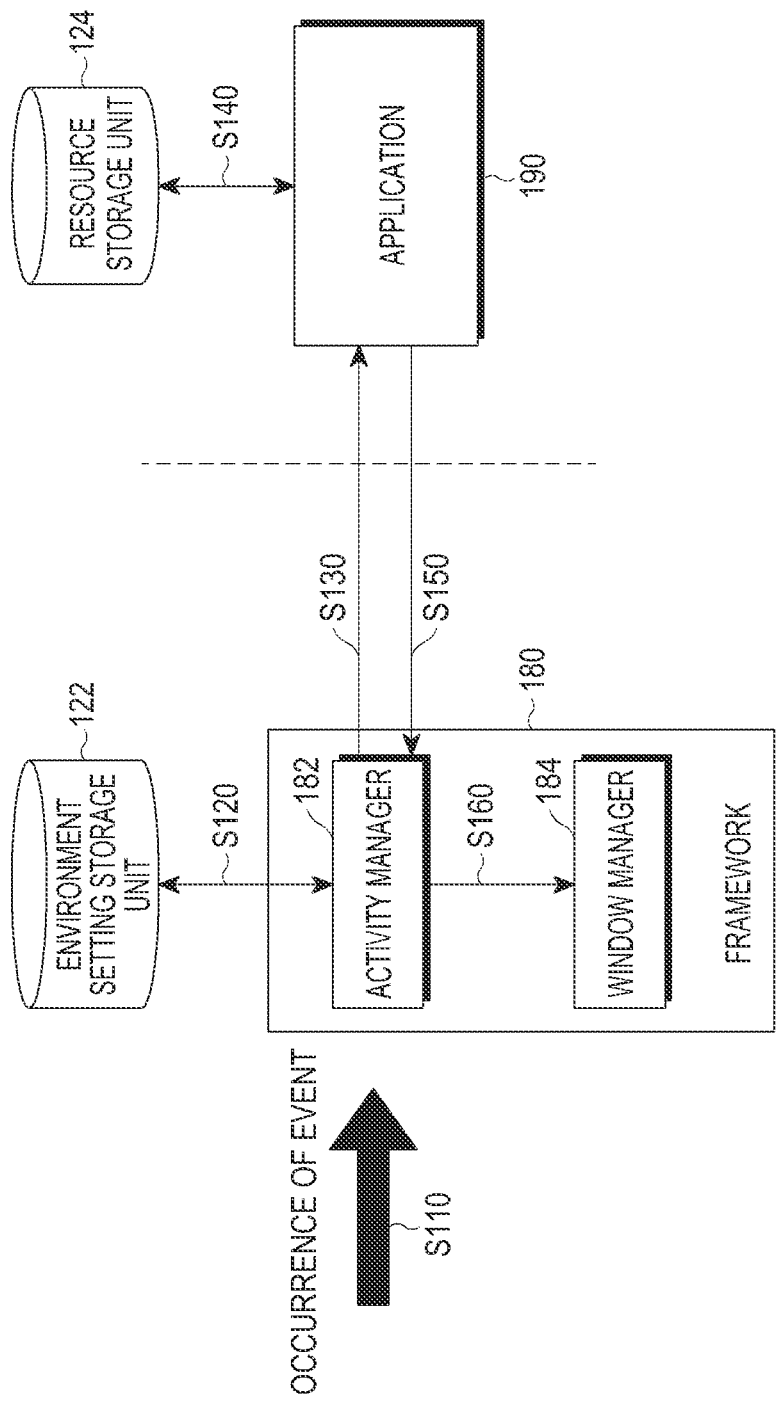
FIG. 2 is a flowchart for describing a method of changing an object size described by Device-Independent Pixels (DIP) and Dots Per Inch (DPI) according to a DPI setting to magnify or reduce a full screen or a part of the screen of a display unit according to an embodiment of the present disclosure.

FIG. 2 is a flowchart for describing a method of changing an object size described by DIP and DPI according to a DPI setting to magnify or reduce the full screen or a part of the screen of the display unit according to an embodiment of the present disclosure.

Various embodiments of the present disclosure relate to a method of changing DPI in an Android environment. An example of an embodiment of the present disclosure relating to changing DPI in an Android environment is described in relation to FIG. 2.

Referring to FIGS. 1 and 2, the controller 170 may control a framework 180 and an application 190. The framework 180 may include an activity manager 182 and a window manager 184.

The storage unit 120 may include an environment setting storage unit 122 and a resource storage unit 124.

The activity manager 182 may manage a lifecycle (e.g., a series of processes from creation to termination) of an activity (e.g., an application screen). The window manager 184 may manage a shape or size of an application screen such as a window. The activity represents a screen having a user interface.

At operation S110, the activity manager 182 may detect occurrence of an event related to creation of an application screen according to a change of DPI.

At operation S120, the activity manager 182 may search for DPI set by a user in the environment setting storage unit 122 of the storage unit 120. For example, the environment setting storage unit 122 may store a file build.prop which is an environment setting file, and ro.sf.lcd density which is an environment setting parameter of the file build.prop represents DPI (e.g., 320). The activity manager 182 may set environment setting parameter DisplayMetrics.density to ro.sf.lcd density of the activity manager 182.

At operation S130, the activity manager 182 may transfer the found DPI to the application 190. The activity manager 182 or the application 190 may set Configuration.densityDpi which is an environment setting parameter of the application 190 to DisplayMetrics.density. For example, ro.sf.lcd density, DisplayMetrics.density, and Configuration.densityDpi are set to the same value (e.g., 320).

At operation S140, the application 190 may load (e.g., read) a resource corresponding to the DPI from the resource storage unit 124 of the storage unit 120, and create activity data (e.g., screen data) corresponding to the loaded resource. For example, the resource storage unit 124 may include folders corresponding to MDPI, LDPI, HDPI, and XHDPI, respectively, and each folder may store files needed to create activity data. For example, if DPI is 320, the application 190 may load a resource stored in XHDPI.

At operation S150, the application 190 may transfer the created screen data to the activity manager 182.

At operation S160, the activity manager 182 may request the window manager 184 to create an activity based on the screen data and to display the activity on the display unit 160. The window manager 184 may create an activity, and display the activity on the display unit 160, in response to the request.

If orientation of horizontally displaying a screen displayed in a vertical direction is performed in the Android environment, an activity of vertical orientation may terminate, and a new activity of horizontal orientation may be created.

Likewise, if DPI changes, an application screen of initial DPI may terminate according to a lifecycle of the corresponding activity, and a new application screen of the changed DPI may be created.

According to various embodiments of the present disclosure, by changing DPI which is an environment setting value so that an application screen is displayed according to the environment setting value and predetermined DIP, a screen of a desired magnification can be obtained. According to various embodiments of the present disclosure, because only a DPI value which is an environment setting value changes, the method can be applied to preload applications such as launcher and browser and $3^{rd}$ party applications such as online games.

As described above, a size of an object that is to be displayed on a screen is described by DIP or DPI.

For example, when DPI changes so that an application screen of 320 DPI terminates according to a lifecycle of the corresponding activity, and a new application screen of 480 DPI is created, a button is displayed with a size to which 480 DPI has been applied. For example, because a size of a button is described by predetermined DIP and DPI, an application calculates the number of pixels of the button using the same method as that used before DPI changes, although an environment setting value that is used to calculate the number of pixels, that is, a DPI value changes.

Figure 3:
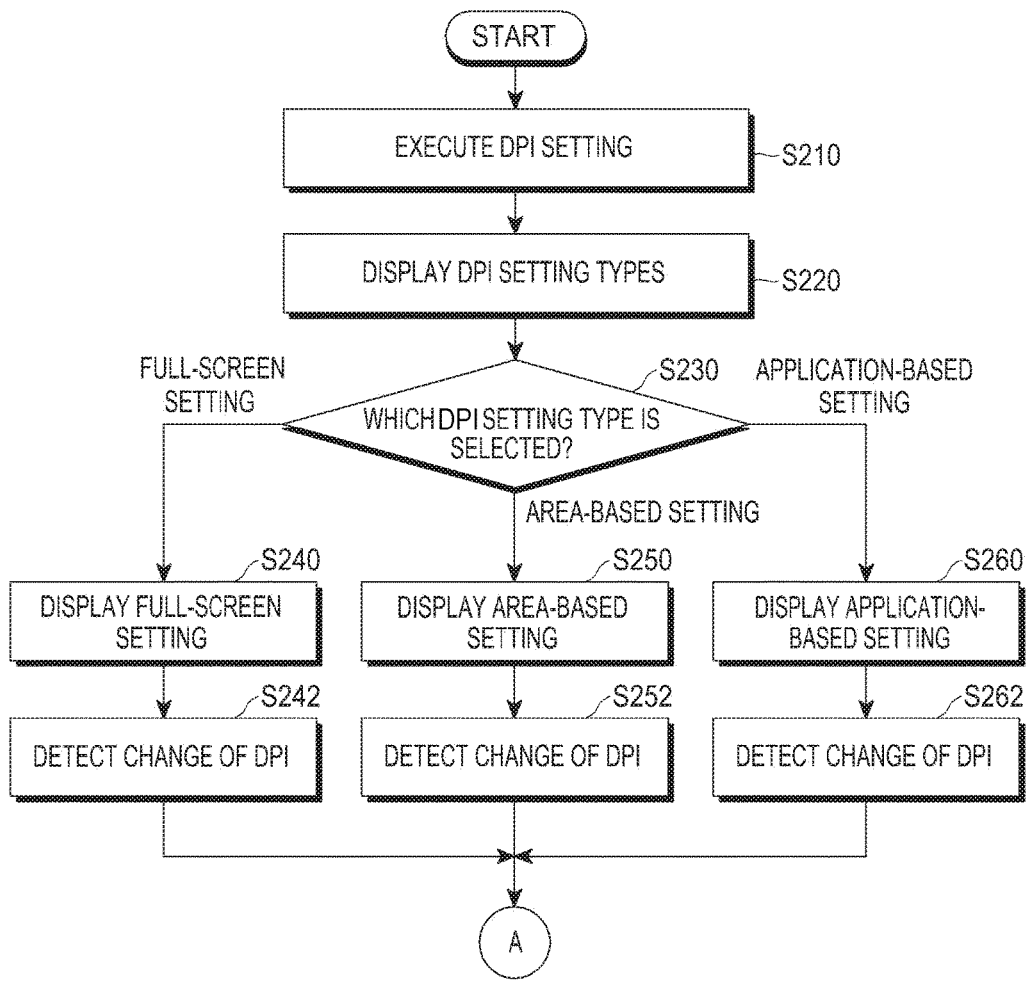
FIGS. 3 and 4 are a flowchart illustrating a method of changing an object size described by DIP and DPI according to a DPI setting to magnify or reduce a full screen or a part of the screen of a display unit, according to an embodiment of the present disclosure.
Figure 4:
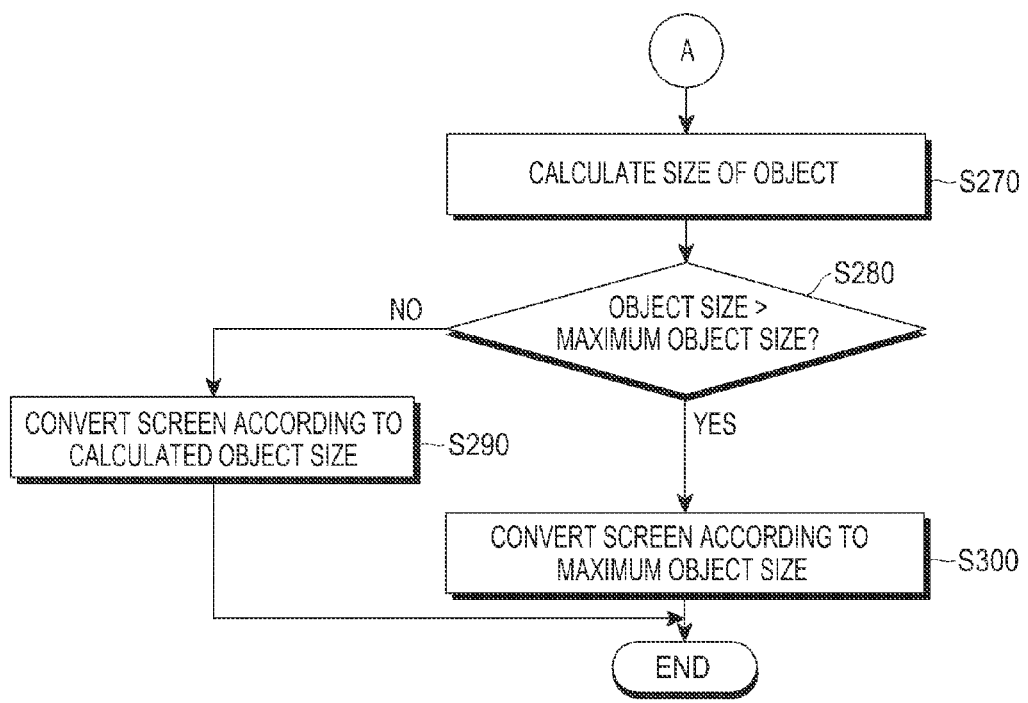

FIGS. 3 and 4 are a flowchart illustrating a method of changing an object size described by DIP and DPI according to a DPI setting to magnify or reduce a full screen or a part of the screen of the display unit 160 according to an embodiment of the present disclosure.

According to various embodiments of the present disclosure, the screen may be an image that is displayed through the display unit 160. An example of an embodiment of the present disclosure in which the screen is an image that is displayed through the display unit 160 is described in relation to FIGS. 3 and 4.

Referring to FIGS. 3 and 4, the method of changing an object size described by DIP and DPI according to a DPI setting includes operations S210 to S300.

At operation S210, a DPI setting may be executed. More specifically, the controller 170 (e.g., the controller 170 illustrated in FIG. 1) may detect a DPI setting selected by a user, and display a DPI setting screen when the DPI setting is executed.

At operation S220, a plurality of DPI setting types may be displayed. The controller 170 may display a plurality of DPI setting types on the DPI setting screen. The plurality of DPI setting types may include at least two of a full-screen setting type, an area-based setting type, and an application-based setting type.

At operation S230, a DPI setting type may be selected. More specifically, the controller 170 may determine which DPI setting type is selected. According to various embodiments of the present disclosure, the controller 170 may determine which one of the full-screen setting type, the area-based setting type, and the application-based setting type has been selected.

If the controller 170 determines that the selected DPI setting type corresponds to the full-screen setting type at operation S230, then the controller 170 may proceed to operation S240 at which a full-screen setting screen may be displayed. More specifically, the controller 170 may determine that the full-screen setting type has been selected by a user, and display a full-screen setting screen. The full-screen setting screen may display DPI upper and lower limits for the electronic device 100, and a user may select a DPI value between the DPI upper limit and the DPI lower limit. Thereafter, the controller 130 may proceed to operation S242.

At operation S242, a change of DPI may be detected. More specifically, if a user selects a DPI value between the DPI upper limit and the DPI lower limit in the full-screen setting screen, the controller 170 may determine that the previous DPI value has changed to the DPI value selected by the user. Thereafter, the controller 130 may proceed to operation S270.

If the controller 170 determines that the selected DPI setting type corresponds to the area-based setting type at operation S230, then the controller 170 may proceed to operation S250 at which an area-based setting screen may be displayed. More specifically, the controller 170 may determine that the area-based setting type has been selected by the user, and display an area-based setting screen. The area-based setting screen may display DPI upper and lower limits for the electronic device 100, and the user may select a DPI value between the DPI upper limit and the DPI lower limit. Thereafter, the controller 130 may proceed to operation S252.

At operation S252, a change of DPI may be detected. More specifically, if the user selects a DPI value between the DPI upper limit and the DPI lower limit in the area-based setting screen, the controller 170 may determine that the previous DPI value has changed to the DPI value selected by the user. Thereafter, the controller 130 may proceed to operation S270.

If the controller 170 determines that the selected DPI setting type corresponds to the application-based setting type at operation S230, then the controller 170 may proceed to operation S260 at which an application-based setting screen may be displayed. More specifically, the controller 170 may determine that the application-based setting type has been selected by the user, and display an application-based setting screen. The application-based setting screen may display DPI upper and lower limits for the electronic device 100, and the user may select a DPI value between the DPI upper limit and the DPI lower limit. Thereafter, the controller 130 may proceed to operation S262.

At operation S262, a change of DPI may be detected. More specifically, if the user selects a DPI value between the DPI upper limit and the DPI lower limit in the application-based setting screen, the controller 170 may determine that the previous DPI value has changed to the DPI value selected by the user. Thereafter, the controller 130 may proceed to operation S270.

At operation S270, an object size may be calculated. For example, an object size of the corresponding application screen may be calculated based on the changed DPI. The controller 170 may calculate a size of an object that is to be displayed on the screen, based on the changed DPI and predetermined DIP. Calculating the size of the object may correspond to calculating a screen magnification.

For example, a source code for a button may be as follows.

TABLE 2

<Button
    android:layout_width="320dp"
    android:layout_height="wrap_content"/>

For example, if DIP is 320 and DPI is 320, the number px of horizontal pixels of the button may be calculated as 640 (i.e., 320×320/160). As another example, if DIP is 320 and DPI is 480, the number px of horizontal pixels of the button may be calculated as 960 (i.e., 320×480/160).

For example, if DPI changes from 320 to 480, the number of horizontal pixels of the button is 960, and a maximum horizontal size (or a horizontal threshold value) of a screen on which the button is to be displayed is 800 pixels, 800 pixels of 960 pixels are displayed, and the remaining 160 pixels cannot be displayed because the size of the button exceeds the size of the screen. As a result, a right or left part of the button is cut off.

For example, if DPI changes from 480 to 320, the number of horizontal pixels of the button is 640, and a maximum horizontal size (or a horizontal threshold value) of a screen on which the button is to be displayed is 800 pixels, a blank space of 160 pixels may be made to the right or left of the button because the size of the button is smaller than the size of the screen.

At operation S280, a determination as to whether the calculated object size exceeds a maximum object size (or a size threshold value) may be made. For example, the controller 170 may determine whether the calculated object size exceeds the maximum object size. More specifically, the controller 170 may compare the calculated object size to the maximum object size. If the calculated object size is equal to or smaller than the maximum object size, the controller 170 may proceed to operation S290. In contrast, if the calculated object size exceeds the maximum object size, the controller 170 may proceed to operation S300.

At operation S290, the application screen may be converted. For example, if the calculated object size is equal to or smaller than the maximum object size, the controller 170 may convert the application screen according to the calculated object size. For example, if DPI is 320, a button of 640 pixels may be displayed according to the original configuration of the button on the screen.

At operation S300, the application screen may be converted. For example, if the calculated object size exceeds the maximum object size, the controller 170 may change the application screen based on the maximum object size. For example, if DIP is 320 and DPI is 480, a button of 960 pixels may be reduced to a size of 800 pixels and then displayed on the screen.

FIGS. 5A, 5B, 6A, and 6B are views for describing an example of a method of changing an object size described by DIP and DPI according to a DPI setting to magnify or reduce a full screen of a display unit according to an embodiment of the present disclosure.

Referring to FIG. 5A, a home screen 210 is illustrated before magnification or reduction. The home screen 210 may include a state bar screen 212 to display updates of applications, an execution state of a short-range communication module, reception signal intensity, a time, and/or the like, an icon to display a list of all applications, an icon to display a list of recently used applications, an application screen 214 to display icons of the individual applications, and a menu screen 216 including a search icon or a home icon. For example, the home screen 210 before DPI changes may be displayed with 320 DPI.

The controller 170 (e.g., the controller 170 illustrated in FIG. 1) may detect a DPI setting executed by a user, and display a DPI setting screen 220 as illustrated in FIG. 5B.

Referring to FIG. 5B, the DPI setting screen 220 may display a full-screen setting 222, an area-based setting 224, an application-based setting 226, and a user-based setting 228. Setting or changing DPI may be done for a full screen, for each area (or each application screen) of a screen, or for each application.

If the controller 170 determines that the user-based setting 228 has been selected by the user, and receives a user input of a predetermined pattern, the controller 170 may apply a DPI setting selected by the user from among the full-screen setting 222, the area-based setting 224, and the application-based setting 226. If the user-based setting is not selected, the controller 170 may receive a DPI setting selected by the user from among the full-screen setting 221, the area-based setting 224, and the application-based setting 226, and apply the DIP setting selected by the user. The user input of the predetermined pattern may be a spatial gesture of a predetermined pattern, a touch gesture of a predetermined pattern, a predetermined voice command, and/or the like. For example, the touch gesture of the predetermined pattern may be a spread gesture or a pinch gesture using at least three fingers.

If the user selects the full-screen setting 222, the controller 170 may detect the user's selection 221 of the full-screen setting 222, and display a full-screen setting screen 230 as illustrated in FIG. 6A. In the drawings related to the following description, circles drawn by dotted lines represent a location of a user touch.

Referring to FIG. 6A, on the full-screen setting screen 230, a sliding button 232 to allow the user to select a DPI value between a lower limit of 100% corresponding to 320 DPI and a upper limit of 150% corresponding to 480 DPI through sliding, a OK button 242, and a cancel button 244 may be displayed. The upper and lower limits of 150% and 100% are examples of DPI threshold values for the electronic device 100, and the upper and lower limits may be set to different values.

FIG. 6A illustrates an example in which a DPI value is selected through the sliding button 232 is shown. However, according to various embodiments of the present disclosure, a DPI value may be input directly by the user or when the user selects one of buttons corresponding to various DPI values. For example, if the user selects 480 DPI and then selects the OK button 242 on the full-screen setting screen 230, the controller 170 may calculate a size of each object that is to be displayed on the full screen, based on 480 DPI (e.g., changed from 320 DPI that are initial DPI) and predetermined DIP. Then, the controller 170 may compare the calculated object size to a maximum object size. If the calculated object size is equal to or smaller than the maximum object size, the controller 170 may maintain the calculated object size, and if the calculated object size exceeds the maximum object size, the controller 170 may limit the object size to the maximum object size.

As illustrated in FIG. 6A, the user may input a selection 231 of a DPI value using the sliding button 232. The user may input a confirmation 246 of the selection 231 using the OK button 242.

The controller 170 may change the home screen 210a according to the calculated or limited object size. For example, as illustrated in FIG. 6B, if the user inputs a selection 246 providing confirmation of the selection 231 using the OK button 242, the controller 170 may change the home screen 210. As another example, user may select the cancel button 244 to return the sliding button 232 to the location of the initial DPI.

Referring to FIG. 6B, by changing the full screen in this way, the state bar screen 212a, the application screen 214a, and the menu screen 216a may be magnified. As illustrated in FIG. 6B, images (e.g., a reception signal intensity image) and text (e.g., a time) in the state bar screen 212a, images (e.g., icons) and text (icon names, such as Market, +talk, and 11t) in the application screen 214a, and images (e.g., icons) in the menu screen 216a may be magnified. Alternatively, the state bar screen 212a may be displayed so as to maintain an initial state thereof, and the application screen 214a and the menu screen 216a may be displayed so as to be magnified. Alternatively, the state bar screen 212a and the menu screen 216a may be displayed so as to maintain an initial state thereof, and the application screen 214a may be displayed so as to be magnified.

After the full screen changes, the controller 170 may display a message window 250 including a Yes button 252 and a No button 254 in order to receive a confirmation of the changed DPI from the user. If the user selects the Yes button 252, the controller 170 may maintain the changed DPI. In contrast, if the user selects the No button 254, the controller 170 may perform full-screen conversion to return to the initial DPI.

FIGS. 7A, 7B, and 7C are views for describing an example of a method of changing an object size described by DIP and DPI according to a DPI setting to independently magnify or reduce individual areas of the display unit according to an embodiment of the present disclosure.

Referring to FIGS. 7A and 7B, if a user selects the area-based setting 224 on the DPI setting screen 220 using selection 221 as illustrated in FIG. 7A, an area-based (screen-based) setting screen 260 as illustrated in FIG. 7B may be displayed.

As illustrated in FIG. 7B, on the area-based setting screen 260, a state bar setting 262 for setting DPI of a state bar screen, an application setting 266 for setting DPI of an application screen, a OK button 242, and a cancel button 244 may be displayed. The state bar screen and the application screen may be referred to as a state notification frame (or a state notification frame screen) and a main frame (or a main frame screen), respectively.

According to various embodiments of the present disclosure, referring to the state bar setting 262, the user may select a DPI value between a lower limit of 100% corresponding to 320 DPI and an upper limit of 150% corresponding to 480 DPI through sliding of a first sliding button 264.

According to various embodiments of the present disclosure, referring to the application setting 266, the user may select a DPI value between a lower limit of 100% corresponding to 320 DPI and an upper limit of 150% corresponding to 480 DPI through sliding of a second sliding button 268.

For example, if the user selects an initial DPI value (e.g., 100% corresponding to 320 DPI) in the state bar setting 262, selects 480 DPI in the application setting 266, and then selects the OK button 242, the controller 170 (e.g., the controller 170 illustrated in FIG. 1) may calculate a size of each object that is to be displayed on an application screen, based on 480 DPI (e.g., a DPI that is changed from 320 DPI corresponding to an initial DPI) and predetermined DIP. The controller 170 may compare the calculated object size to a maximum object size. If the calculated object size is equal to or smaller than the maximum object size, the controller 170 may maintain the calculated object size. In contrast, if the calculated object size exceeds the maximum object size, the controller 170 may limit the object size to the maximum object size. The controller 170 may change an application screen 284 according to the calculated or limited object size, and maintain the state bar screen 282 at a current setting without changing the initial DPI.

As illustrated in FIG. 7C, by changing a screen based on area in such a way, a screen 280 may include the state bar screen 282 displayed according to a current setting, and the application screen 284 displayed so as to be magnified. As illustrated in FIGS. 7A to 7C, images (e.g., a reception signal intensity image) and text (e.g., a time) in the state bar screen 282 may be displayed according to initial states thereof without being magnified or reduced, and images (e.g., icons) and text (icon names, such as Market, +talk, and 11) in the application screen 284 may be magnified.

After the screen changes based on area, the controller 170 may display a message window 250 including a Yes button 252 and a No button 254 in order to receive a confirmation of the changed DIP from the user. If the user inputs a selection 256 so as to select the Yes button 252, the controller 170 may maintain the changed DPI. In contrast, if the user selects the No button 254, the controller 170 may perform full-screen conversion or area-based screen conversion to return to the initial DPI.

The example illustrated in FIGS. 7A to 7C relates to a case in which a home screen does not include a menu screen such as a soft key screen (or a soft key application screen). Hereinafter, a case in which a home screen includes a menu screen such as a soft key screen (or a soft key application) will be described with reference to FIGS. 8A to 8C. The soft key may include a home key, a back key (or a cancel key), and a menu key.

FIGS. 8A, 8B, and 8C are views for describing an example of a method of changing an object size described by DIP and DPI according to a DPI setting to independently magnify or reduce individual areas of a display unit according to an embodiment of the present disclosure.

Referring to FIGS. 8A, and 8B, if a user inputs a selection 221 by which the user selects the area-based setting 224 on the DPI setting screen 220 as illustrated in FIG. 8A, an area-based setting screen 260 may be displayed as illustrated in FIG. 8B.

Referring to FIG. 8B, on the area-based setting screen 260, a state bar setting 262 for setting DPI of a state bar screen, an application setting 266 for setting DPI of an application screen, a soft key setting 270 for setting DPI of a soft key screen, a OK button 242, and a cancel button 244 may be displayed.

According to various embodiments of the present disclosure, referring to the state bar setting 262, the user may select a DPI value between a lower limit of 100% corresponding to 320 DPI and an upper limit of 150% corresponding to 480 DPI through sliding of a first sliding button 264.

According to various embodiments of the present disclosure, referring to the application setting 266, the user may select a DPI value between a lower limit of 100% corresponding to 320 DPI and an upper limit of 150% corresponding to 480 DPI through sliding of a second sliding button 268.

According to various embodiments of the present disclosure, referring to the soft key setting 270, the user may select a DPI value between a lower limit of 100% corresponding to 320 DPI and an upper limit of 150% corresponding to 480 DPI through sliding of a third sliding button 272.

For example, if the user selects an initial DPI value (e.g., 100% corresponding to 320 DPI) in the state bar setting 262, selects 480 DPI in the application setting 266, selects 480 DPI in the soft key setting 270, and then inputs a selection 246 by which the user selects the OK button 242, a screen 280 as illustrated in FIG. 8C may be displayed.

Referring to FIG. 8C, the state bar screen 282 may be displayed according to a current setting with 320 DPI corresponding to initial DPI, the application screen 284 may be displayed with 480 DPI changed from 320 DPI, and the soft key screen 286 may be displayed with 480 DPI changed from 320 DPI. In the present example, a task manager screen showing a list of applications being currently executed may be displayed on the application screen 284.

As illustrated in FIG. 8C, by changing a screen based on area in such way, a screen 280 may include the state bar screen 282 displayed according to a current setting, and the application screen 284 (e.g., a task manager screen) and the soft key screen 286 displayed so as to be magnified. As illustrated in FIGS. 8A to 8C, images (e.g., a reception signal intensity image) and text (e.g., a time) in the state bar screen 282 may be displayed according to initial states thereof without being magnified or reduced, and images and text in the application screen 284 and soft keys in the soft key screen 286 may be magnified. The soft keys may include a home key 292, a back key (or a cancel key) 294, and a menu key 296.

After the screen changes based on area, the controller 170 may display a message window 250 including a Yes button 252 and a No button 254 in order to receive a confirmation of the changed DPI from the user. If the user inputs a selection 256 so as to select the Yes button 252, the controller 170 may maintain the changed DPI. In contrast, if the user selects the No button 254, the controller 170 may perform full-screen conversion or area-based screen conversion to return to the initial DPI.

FIGS. 9A 9B, 10A, and 10B are views for describing an example of a method of changing an object size described by DIP and DPI according to a DPI setting to independently magnify or reduce individual applications according to an embodiment of the present disclosure.

Referring to FIGS. 9A and 9B, if a user inputs a selection 221 by which the user selects the application-based setting 226 on the DPI setting screen 220 as illustrated in FIG. 9A, an application list 310 as illustrated in FIG. 9B may be displayed. The application list 310 may list applications in which DPI can be changed as selectable application items, and each application item may include an icon of the application, a name of the application, and/or a description about the application.

If the user selects one or more applications from the application list 310, an application-based setting screen 320 as illustrated in FIG. 10A may be displayed. In the present example, the user may input a selection 314 by which the user selects a map application 312.

Referring to FIG. 10A, on the application-based setting screen 320, a sliding button 330 to allow a user to select a DPI value between a lower limit of 100% corresponding to 320 DPI and a upper limit of 150% corresponding to 480 DPI through sliding the sliding button 330, an OK button 242, and a cancel button 244 may be displayed. According to various embodiments of the present disclosure, the upper limit of 150% and the lower limit of 100% are examples of DPI threshold values, and the upper limit and/or the lower limit may be set to different values. In the present example, a case in which a user inputs a selection 321 by which a DPI value is selected through the sliding button 330 is shown. However, according to various embodiments of the present disclosure, a DPI value may be input directly by the user or when the user selects one of buttons corresponding to various DPI values.

For example, if the user selects 480 DPI, and then inputs a selection 246 to select the OK button 242 on the application-based setting screen 320, the controller 170 may calculate a size of each object that is to be displayed on a map application screen, based on 480 DPI (e.g., changed from 320 DPI corresponding to an initial DPI) and predetermined DIP. The controller 170 may compare the calculated object size to a maximum object size. If the calculated object size is equal to or smaller than the maximum object size, the controller 170 may maintain the calculated object size, and if the calculated object size exceeds the maximum object size, the controller 170 may limit the object size to the maximum object size. The controller 170 may change a map application screen 334 according to the calculated or limited object size. The user may select the cancel button 244 to return the sliding button 330 to the location of the initial DPI.

As illustrated in FIG. 10B, by changing a screen based on application in such a way, a screen 340 may include a state bar screen 332 displayed so as to maintain an initial state thereof, and the application screen 334 displayed so as to be magnified. For example, images (e.g., a reception signal intensity image) and text (e.g., a time) in the state bar screen 332 may be displayed according to initial states thereof without being magnified or reduced, and images (e.g., a map and icons) and text (e.g., "map" and "my location") in the application screen 334 may be magnified.

If the user terminates the map application, and executes a facebook application, a facebook application screen may be displayed with 320 DPI corresponding to an initial DPI. If the user terminates the map application, and executes the map application again, the map application screen may be displayed with 480 DPI corresponding to the changed DPI.

After the screen changes based on application, the controller 170 may display a message window 250 including a Yes button 252 and a No button 254 in order to receive a confirmation of the changed DIP from the user. If the user inputs a selection 256 so as to select the Yes button 252, the controller 170 may maintain the changed DPI. In contrast, if the user selects the No button 254, the controller 170 may perform full-screen conversion or application-based screen conversion to return to the initial DPI.

Figure 11A:
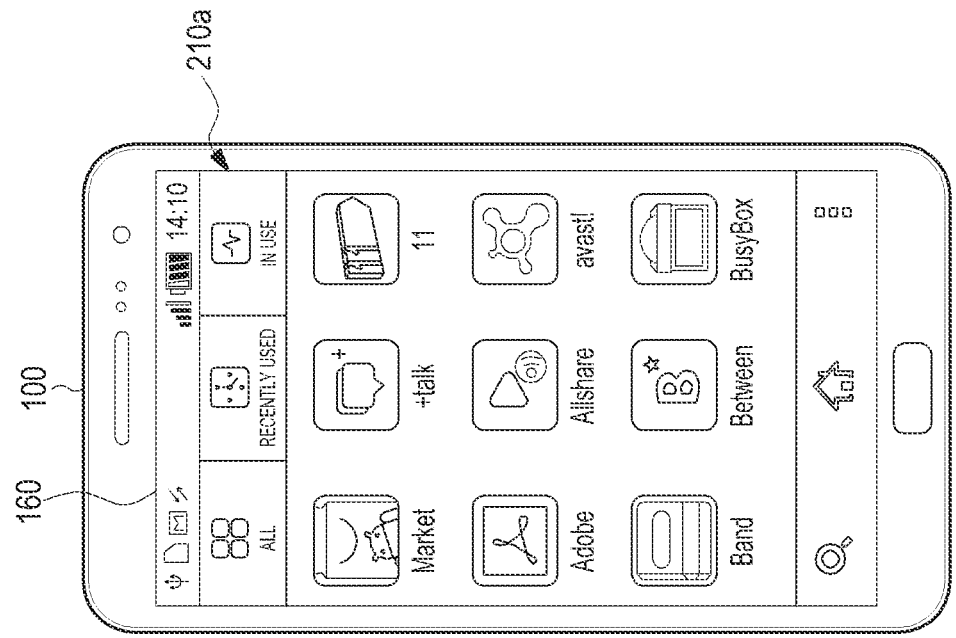
FIGS. 11A and 11B are views for describing an example of a method of changing an object size described by DIP and DPI according to a touch gesture to independently magnify or reduce individual areas of a display unit according to an embodiment of the present disclosure.
Figure 11B:
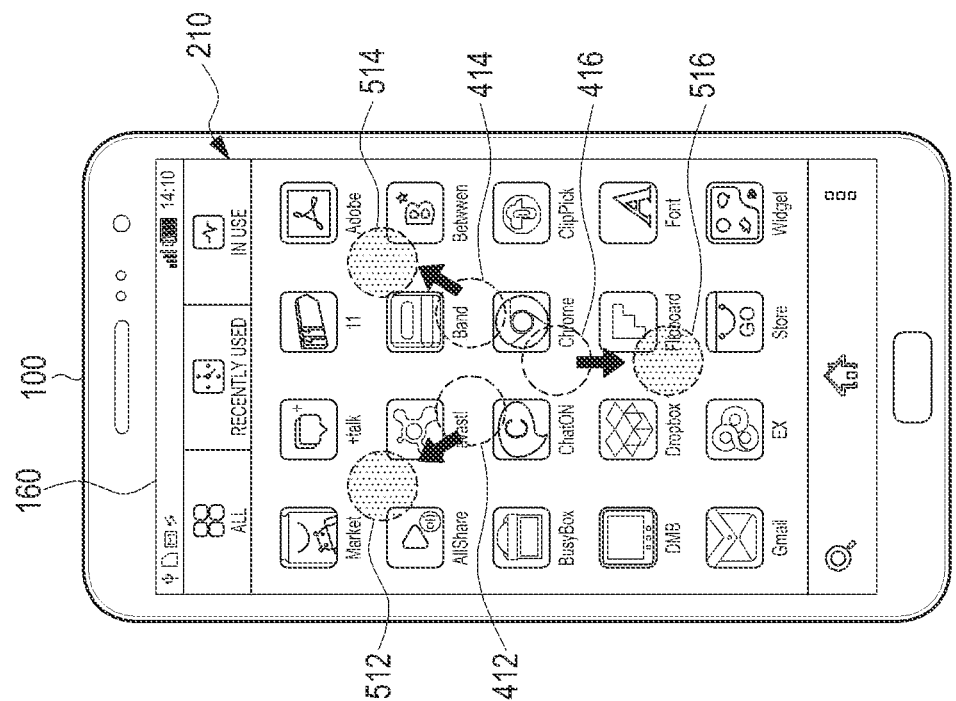

FIGS. 11A and 11B are views for describing an example of a method of changing an object size described by DIP and DPI according to a touch gesture to independently magnify or reduce individual areas of a display unit according to an embodiment of the present disclosure.

Referring to FIGS. 11A and 11B, the present example relates to a case in which a DIP setting type is a full-screen setting, and a spread gesture or a pinch gesture using three fingers has been set to a user input.

FIG. 11A illustrates a home screen 210 before magnification or reduction. A user may touch three points 412, 414, and 416 on the display unit 160 with three fingers, and then outstretch the three fingers in order to change DPI. For example, the points 412, 414, and 416 then move to points 512, 514, and 516, respectively.

In response to the user input, the controller 170 (e.g., the controller 170 illustrated in FIG. 1) may calculate a size of each object that is to be displayed on a full screen, based on 480 DPI (e.g., changed from 320 DPI corresponding to an initial DPI) and predetermined DIP. The controller 170 may compare the calculated object size to a maximum object size. If the calculated object size is equal to or smaller than the maximum object size, the controller 170 may maintain the calculated object size. In contrast, if the calculated object size exceeds the maximum object size, the controller 170 may limit the object size to the maximum object size. The controller 170 may convert the home screen 210 to a home screen 210a according to the calculated or limited object size, as illustrated in FIG. 11B.

As illustrated in FIG. 11B, by changing the screen in this way, a state bar screen, an application screen, and a menu screen may be magnified. For example, images (e.g., a reception signal intensity image) and text (e.g., a time) in the state bar screen, images (e.g., icons) and text (e.g., icon names, such as Market, +talk, and 11) in the application screen, and images (icons) in the menu application screen may be respectively magnified. Alternatively, the state bar screen may be displayed so as to maintain an initial state thereof, and the application screen and the menu screen may be displayed so as to be magnified. Alternatively, the state bar screen and the menu screen may be displayed so as to maintain an initial state thereof, and the application screen may be displayed so as to be magnified.

According to various embodiments of the present disclosure as described above, there is provided a method of adjusting a screen magnification of an electronic device through a simple manipulation, wherein the method can be applied to most of existing applications without modifying the applications.

It will be appreciated that various embodiments of the present disclosure can be realized in the form of hardware, software, or a combination of hardware and software. For example, the individual components of the electronic device 100 illustrated in FIG. 1, such as the storage unit 160, the communication unit 150, the controller 170, and/or the like, may be realized in the form of hardware, and the framework or applications illustrated in FIG. 2 may be realized in the form of either hardware or software. Any such software may be stored in volatile or non-volatile storage such as, for example, a storage device like a ROM, whether erasable or rewritable or not, in memory such as, for example, RAM, memory chips, device or integrated circuits, or in an optically or magnetically writable, non-transitory machine-readable (e.g., non-transitory computer-readable) medium such as, for example, a CD, DVD, magnetic disk or magnetic tape, and/or the like. The storage unit 120 that can be included in the electronic device is an example of a non-transitory machine-readable storage medium suitable to store a program or programs including instructions for implementing various embodiments of the present disclosure. Accordingly, various embodiments of the present disclosure include a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The electronic device may receive and store the program from a program providing apparatus connected to the electronic device in a wired or wireless fashion. The program providing apparatus may store programs including instructions for performing the method of adjusting the screen magnification of the electronic device, and include a memory for storing information needed to perform the method of adjusting the screen magnification of the electronic device, a communication unit to perform a wired or wireless communication with the electronic device, and a controller to transmit a program to the electronic device according to a request from the electronic device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of adjusting a screen magnification of an electronic device, the method comprising:
   displaying a dots per inch (DPI) setting screen on a display of the electronic device;
   receiving a user inputted changed DPI value through the DPI setting screen;
   storing the changed DPI value in a memory of the electronic device; and
   in response to a touch gesture input of a predetermined pattern on a home screen, displaying a first object of the home screen in a first size based on a screen magnification which is calculated based on the changed DPI value and a preset device-independent pixel (DIP), while maintaining a second size of a second object of the home screen.

2. The method of claim 1, further comprising:
   comparing a size of a third object changed to correspond to the screen magnification to a maximum object size that is able to be displayed on the display; and
   maintaining the size of the third object if the size of the third object is equal to or smaller than the maximum object size, and limiting the size of the third object to the maximum object size if the size of the third object exceeds the maximum object size.

3. The method of claim 1,
   wherein the DPI setting screen displays a DPI upper limit and a DPI lower limit for the electronic device, and
   wherein the changed DPI value is DPI between the DPI upper limit and the DPI lower limit.

4. The method of claim 1, further comprising:
   displaying a plurality of DPI setting types; and
   detecting a selection of one of the plurality of DPI setting types.

5. The method of claim 4, wherein the plurality of DPI setting types include at least two of a full-screen setting, an area-based setting, and an application-based setting.

6. A non-transitory machine-readable storage medium for recording a program, which when executed, causes at least one processor to perform a method of adjusting a screen magnification of an electronic device, the method comprising:
   detecting user inputted changed dots per inch (DPI) value for at least one object to be displayed on a display of the electronic device;
   storing the changed DPI value in a memory of the electronic device; and
   in response to a touch gesture input of a predetermined pattern on a home screen, displaying a first object of the home screen in a first size based on a screen magnification which is calculated based on the changed DPI value and a preset device-independent pixel (DIP), while maintaining a second size of a second object of the home screen.

7. An electronic device comprising:
   a display configured to display a screen;
   a memory configured to store dots per inch (DPI) of the display; and
   a processor configured to:
      control the display to display a DPI setting screen,
      receive a user inputted changed DPI value through the DPI setting screen,
      store the changed DPI value in the memory, and
      in response to a touch gesture input of a predetermined pattern on a home screen, display a first object of the home screen in a first size based on a screen magnification which is calculated based on the changed DPI value and a preset device-independent pixel (DIP), while maintaining a second size of a second object of the home screen.

8. The electronic device of claim 7, wherein the processor is further configured to:

maintain a size of a third object if the size of the third object is equal to or smaller than a maximum object size, and limit the size of the third object to the maximum object size if the size of the third object exceeds the maximum object size.

9. The electronic device of claim 7, wherein the DPI setting screen displays a DPI upper limit and a DPI lower limit for the electronic device, and wherein the changed DPI value is DPI between the DPI upper limit and the DPI lower limit.

10. The electronic device of claim 7, wherein the processor is configured to:

control the display to display a plurality of DPI setting types, and detect a selection of one of the plurality of DPI setting types.

11. The electronic device of claim 10, wherein the plurality of DPI setting types include at least two of a full-screen setting, an area-based setting, and an application-based setting.

* * * * *